US009358914B2

(12) United States Patent
Humbert (10) Patent No.: US 9,358,914 B2
(45) Date of Patent: Jun. 7, 2016

(54) SEATBELT ANCHOR SYSTEMS FOR AIRCRAFT AND OTHER VEHICLES, AND ASSOCIATED METHODS OF MANUFACTURE AND USE

(71) Applicant: AmSafe, Inc., Phoenix, AZ (US)

(72) Inventor: Todd J. Humbert, Chandler, AZ (US)

(73) Assignee: AmSafe, Inc., Phoenix, AZ (US)

( * ) Notice: Subject to any disclaimer, the term of this patent is extended or adjusted under 35 U.S.C. 154(b) by 180 days.

(21) Appl. No.: 14/297,457

(22) Filed: Jun. 5, 2014

(65) Prior Publication Data
US 2015/0352991 A1    Dec. 10, 2015

(51) Int. Cl.
*B60N 2/68* (2006.01)
*B60R 21/02* (2006.01)
*B64D 11/00* (2006.01)
*B60R 22/18* (2006.01)

(52) U.S. Cl.
CPC ............... *B60N 2/688* (2013.01); *B60R 21/02* (2013.01); *B60R 22/18* (2013.01); *B64D 11/00* (2013.01); *Y10T 24/40* (2015.01); *Y10T 24/45251* (2015.01); *Y10T 24/45984* (2015.01)

(58) Field of Classification Search
CPC ........ B60N 2/688; B60R 21/02; B64D 11/00; Y10T 24/40; Y10T 24/45251; Y10T 24/45984; F16B 21/18
USPC .............. 24/163 R, 197, 594.1, 700; 297/468
See application file for complete search history.

(56) References Cited

U.S. PATENT DOCUMENTS

| 805,674 | A | 11/1905 | Senderling |
| 820,383 | A | 5/1906 | Ashland |
| 867,162 | A | 9/1907 | Seidl |
| 940,917 | A | 11/1909 | Asquith |
| 1,171,380 | A | 2/1916 | Arthur |
| 1,299,821 | A | 4/1919 | Carpmill et al. |
| 1,397,237 | A | 11/1921 | Schenk |

(Continued)

FOREIGN PATENT DOCUMENTS

| CA | 2450995 | 12/2003 |
| CA | 2522705 | 11/2004 |

(Continued)

OTHER PUBLICATIONS

International Search Report and Written Opinion dated Jul. 8, 2015; International Application No. PCT/US2015/023656; 6 pages.

(Continued)

*Primary Examiner* — Robert J Sandy
*Assistant Examiner* — David Upchurch
(74) *Attorney, Agent, or Firm* — Perkins Coie LLP (57) ABSTRACT

Apparatuses, devices and systems for attaching seatbelts to anchoring structures in aircraft and other vehicles, are described herein. In some embodiments, such apparatuses include a modular connector having a base configured to be attached to an anchoring structure, a body configured to be attached to a seatbelt, and an annular lock configured to releasably couple the body to the base. In these embodiments, the body carries the lock adjacent to an aperture configured removably receive the base. When the body is pressed over the base, the base passes into the aperture and contacts the annular lock, expanding the lock outwardly around the base. The base continues moving though the aperture in the body until the lock retracts into a groove in base, thereby releasaby locking the body to the base.

26 Claims, 6 Drawing Sheets

(56) References Cited

U.S. PATENT DOCUMENTS

| | | | |
|---|---|---|---|
| 2,124,276 A | 7/1938 | Steigenberger | |
| 2,393,551 A | 1/1946 | Morin | |
| 2,398,947 A | 4/1946 | Marinsky | |
| 2,549,841 A | 4/1951 | Morrow et al. | |
| 2,763,451 A | 9/1956 | Moran | |
| 2,856,663 A | 10/1958 | Elsner | |
| 2,938,254 A | 5/1960 | Gaylord | |
| 3,013,517 A | 12/1961 | Isham | |
| 3,128,520 A | 4/1964 | Carter et al. | |
| 3,406,433 A | 10/1968 | Frey | |
| 3,414,947 A | 12/1968 | Holmberg et al. | |
| 3,540,091 A | 11/1970 | Marosy | |
| 3,610,063 A * | 10/1971 | Hart | F16B 21/18 24/627 |
| 3,675,499 A | 7/1972 | Marosy | |
| 4,027,361 A | 6/1977 | Yoneya | |
| 4,136,422 A | 1/1979 | Ivanov et al. | |
| 4,184,234 A | 1/1980 | Anthony et al. | |
| 4,419,874 A | 12/1983 | Brentini | |
| 4,487,588 A | 12/1984 | Lewis, III et al. | |
| 4,525,901 A | 7/1985 | Krauss | |
| 4,542,563 A | 9/1985 | Befort | |
| 4,606,577 A | 8/1986 | Hirama et al. | |
| 4,660,889 A | 4/1987 | Anthony et al. | |
| 4,678,210 A * | 7/1987 | Balsells | F16L 37/084 285/306 |
| 4,685,177 A | 8/1987 | Escaravage | |
| 4,721,338 A | 1/1988 | Kondo | |
| 4,876,770 A | 10/1989 | Bougher | |
| 4,906,031 A | 3/1990 | Vyse | |
| 4,919,484 A | 4/1990 | Bougher et al. | |
| 4,925,221 A | 5/1990 | Carmody et al. | |
| 5,005,266 A | 4/1991 | Fister et al. | |
| 5,005,267 A | 4/1991 | Sugimoto | |
| 5,031,962 A | 7/1991 | Lee | |
| 5,050,906 A * | 9/1991 | Kneip | B60R 22/16 280/801.1 |
| 5,377,386 A | 1/1995 | Griffith | |
| 5,411,348 A * | 5/1995 | Balsells | F16B 9/02 174/372 |
| 5,430,914 A | 7/1995 | Patterson et al. | |
| 5,466,044 A | 11/1995 | Barley et al. | |
| 5,471,714 A | 12/1995 | Olson | |
| 5,487,588 A | 1/1996 | Burleigh et al. | |
| 5,524,965 A | 6/1996 | Barley | |
| 5,568,676 A | 10/1996 | Freeman | |
| 5,669,663 A | 9/1997 | Feuerherdt | |
| 5,695,243 A | 12/1997 | Anthony et al. | |
| 5,774,947 A | 7/1998 | Anscher | |
| 5,779,319 A | 7/1998 | Merrick | |
| 5,816,651 A | 10/1998 | Feuerherdt | |
| 5,890,762 A | 4/1999 | Yoshida | |
| 5,915,630 A | 6/1999 | Step | |
| 5,918,934 A | 7/1999 | Siegrist | |
| 5,941,601 A | 8/1999 | Scott et al. | |
| 5,979,982 A | 11/1999 | Nakagawa | |
| 6,017,087 A | 1/2000 | Anthony et al. | |
| 6,030,046 A | 2/2000 | Dorow | |
| 6,082,819 A | 7/2000 | Jackson | |
| 6,183,044 B1 | 2/2001 | Koyanagi et al. | |
| 6,193,310 B1 | 2/2001 | Batalaris et al. | |
| 6,209,957 B1 | 4/2001 | Baloga et al. | |
| 6,234,572 B1 | 5/2001 | Shiino et al. | |
| 6,276,754 B1 | 8/2001 | Youssef-Agha et al. | |
| 6,378,350 B1 | 4/2002 | Ito | |
| 6,400,145 B1 | 6/2002 | Chamings et al. | |
| 6,419,199 B1 | 7/2002 | Skofljanec et al. | |
| 6,425,632 B1 | 7/2002 | Anthony et al. | |
| 6,494,535 B2 | 12/2002 | Galbreath | |
| 6,510,593 B1 | 1/2003 | Kim | |
| 6,566,869 B2 | 5/2003 | Chamings et al. | |
| 6,669,288 B2 | 12/2003 | Yoshida et al. | |
| 6,789,826 B1 * | 9/2004 | Helgenberg | E05B 17/0033 292/300 |
| 6,796,610 B2 | 9/2004 | Nakagawa et al. | |
| 6,820,310 B2 | 11/2004 | Woodward et al. | |
| 6,948,219 B2 | 9/2005 | Kakuda et al. | |
| 6,962,394 B2 | 11/2005 | Anthony et al. | |
| 7,073,233 B2 | 7/2006 | Leva et al. | |
| 7,152,926 B2 | 12/2006 | Wrobel | |
| 7,246,854 B2 | 7/2007 | Dingman et al. | |
| 7,278,684 B2 | 10/2007 | Boyle | |
| 7,353,572 B2 | 4/2008 | Claus et al. | |
| 7,584,998 B2 | 9/2009 | Richter | |
| D610,036 S | 2/2010 | Balensiefer, II | |
| 7,810,220 B2 | 10/2010 | Anthony et al. | |
| 7,862,124 B2 | 1/2011 | Dingman | |
| 7,918,001 B2 | 4/2011 | Buckingham | |
| 8,291,555 B2 | 10/2012 | Buckingham et al. | |
| 8,308,167 B2 * | 11/2012 | Balsells | A61B 17/162 279/23.1 |
| 8,491,345 B2 * | 7/2013 | Leon | H01R 13/17 439/817 |
| 2002/0122690 A1* | 9/2002 | Poon | F16B 21/18 403/326 |
| 2003/0094812 A1* | 5/2003 | Balsells | F16L 37/084 285/318 |
| 2003/0197415 A1 | 10/2003 | Dingman | |
| 2004/0007909 A1 | 1/2004 | Bonk | |
| 2004/0195900 A1 | 10/2004 | The et al. | |
| 2004/0208692 A1 | 10/2004 | Anthony et al. | |
| 2006/0186675 A1 | 8/2006 | Suzumura et al. | |
| 2006/0250013 A1 | 11/2006 | Shao | |
| 2007/0067970 A1 | 3/2007 | Claus et al. | |
| 2009/0250946 A1 | 10/2009 | Buckingham | |
| 2010/0013282 A1 | 1/2010 | Balensiefer | |
| 2010/0029145 A1* | 2/2010 | Balsells | H01R 13/03 439/827 |
| 2010/0247230 A1 | 9/2010 | Buckingham et al. | |
| 2010/0289198 A1* | 11/2010 | Balsells | B21F 35/00 267/151 |
| 2011/0243653 A1 | 10/2011 | Buckingham et al. | |

FOREIGN PATENT DOCUMENTS

| | | |
|---|---|---|
| DE | 19848231 | 2/1998 |
| DE | 19946579 | 4/2001 |
| EP | 0560184 | 9/1993 |
| EP | 0566856 | 10/1993 |
| EP | 0619201 | 10/1994 |
| EP | 0619202 | 10/1994 |
| EP | 0646491 | 4/1995 |
| EP | 0703113 | 3/1996 |
| EP | 0714806 | 6/1996 |
| EP | 0841209 | 5/1998 |
| EP | 0952032 | 10/1999 |
| EP | 0970842 | 1/2000 |
| EP | 982182 | 3/2000 |
| EP | 1059194 | 12/2000 |
| EP | 1099602 | 5/2001 |
| EP | 1231100 | 8/2002 |
| EP | 1414680 | 5/2004 |
| EP | 1472949 | 11/2004 |
| EP | 1439977 | 5/2006 |
| EP | 1628525 | 12/2008 |
| FR | 2782483 | 8/1999 |
| GB | 2055952 | 3/1981 |
| GB | 2346083 | 1/2000 |
| GB | 2349813 | 5/2000 |
| GB | 2365916 | 2/2002 |
| JP | 2002012069 | 1/2002 |
| WO | WO03010024 | 2/2003 |
| WO | WO03010035 | 2/2003 |
| WO | WO2004093533 | 11/2004 |
| WO | WO2009009789 | 1/2009 |
| WO | WO2009124084 | 10/2009 |
| WO | WO2010114571 | 10/2010 |
| WO | WO2010147723 | 12/2010 |

OTHER PUBLICATIONS

Holmbergs, ISOFIX—Connectors, Oct. 18, 2010, 1 page.
Holmbergs, Isofix Connector C2, http://www.holmbergs.se/1/1.0.1.0/47/1/ [accessed May 21, 2010], 2 pages.

(56) References Cited

OTHER PUBLICATIONS

International Organization for Standarization (ISO), Draft Report of the 18th meeting of WG 1 held on Nov. 10-11, 1997 in Orlando, Florida, 11 pages.
Novarace, EU ISOFIX, http://www.novarace.com/index.php?option=com_content&task=view&id=42&Itemid=62 [accessed May 21, 2010], 1 page.
Novarace, NOVAFIX, http://www.novarace.com/index.php?option=com_content&task=view&id=43&Itemid=51 [accessed May 21, 2010], 1 page.
Sabelt Racing Seatbelts and Accessories, http://childsafety.sabelt.com/index.php/eshop/category/Sabelt-Racing-Seatbelts-and-Accessories.html?a=/1/frmCatID/290/ [accessed May 21, 2010], 3 pages.
SafeGuard Buckle Up With Confidence, IMMI, 2002, 12 pages.
Safeguard Child Protection, Seat Attachment Systems Brochure, "IMMI," 2001, 5 pages.
SafeGuard Child Seat Attachment Systems, "IMMI Child Restraint Top Tethers," 1999, 2 pages.

* cited by examiner

SEATBELT ANCHOR SYSTEMS FOR AIRCRAFT AND OTHER VEHICLES, AND ASSOCIATED METHODS OF MANUFACTURE AND USE

TECHNICAL FIELD

The following disclosure relates to seatbelts and, more specifically, to apparatuses for attaching seatbelts to adjacent structures in aircraft and other vehicles.

BACKGROUND

Seatbelts in commercial jets and other aircraft are typically attached to anchor points on opposite sides of the seat frame. A conventional system for attaching seatbelts to anchor points uses a shackle and hook assembly. In this system, a shackle is bolted to each side of the seat frame, and a hook is attached to each end of the seatbelt by a loop of web. The seatbelt is then attached to the seat frame by clipping each of the hooks to one of the shackles, and inserting a cotter pin through a locking element on each of the hooks to prevent the hooks from inadvertently disengaging from the shackles in use.

The commercial aviation industry is constantly striving to reduce aircraft weight and increase fuel economy. A typical shackle and hook assembly weighs approximately 65-70 grams, which results in a total weight of 130-140 grams for the two assemblies required per seat. The negative impact of this weight on fuel economy increases with the number of passenger seats. The commercial aviation industry also tends to replace and refurbish seatbelts on a regular basis. To replace or refurbish a conventional seatbelt attached with a shackle and hook assembly, the cotter pin must first be removed from the hook before the belt can be unclipped from the shackle.

Accordingly, it would be advantageous to provide an apparatus for attaching seatbelts to anchor points that weighed less than conventional shackle and hook systems, and required less time and effort to replace or refurbish than conventional shackle and hook systems.

BRIEF DESCRIPTION OF THE DRAWINGS

FIG. 2A is an enlarged isometric view.

DETAILED DESCRIPTION

The following disclosure describes various embodiments of apparatuses, systems and methods for attaching seatbelts to seat frames or other anchoring structures in aircraft and other vehicles. In one embodiment, for example, an apparatus configured in accordance with the present technology for attaching a seatbelt to an anchor point includes a modular, lightweight connector that can be quickly installed and removed for seatbelt service, replacement, etc. In some embodiments, the connector includes a body attached to a web of the seatbelt, and a cylindrical hub that forms a base fixedly anchored to a seat frame or other anchor point. In this embodiment, the connector body carries a resilient locking device positioned around a circular opening in the body. To install the connector body onto the hub, the circular opening in the body is centered over the hub, and the body is then pressed onto the hub to insert the hub through the opening. As the hub presses through the opening in the connector body, it contacts the annular locking device and forces it to expand diametrically outward around the end of the hub before snapping into a groove in the hub to securely lock the connector body to the hub. To remove the connector body from the hub for servicing or replacement of the seatbelt, a service person simply inserts a circular edge of a cylindrical tool into the annular opening between the connector body and the hub. The tool contacts the locking device and expands it out of the groove in the hub and into an adjacent groove in the connector body. With the locking device removed from the groove in the hub, the connector body can easily be lifted off of the hub together with the tool.

Certain details are set forth in the following description and in FIGS. 1A-4B to provide to a thorough understanding of various embodiments of the present technology. In some instance, well-known structures, materials, operations and/or systems often associated with seatbelts, aircraft seats, aircraft seatbelt systems, etc. are not shown or described in detail in the following disclosure to avoid unnecessarily obscuring the description of the various embodiment of the technology. Those of ordinary skill in the art will recognize, however, that the present technology can be practiced without one or more of the details set forth herein or with other structures, components, methods and so forth.

The terminology used below is to be interpreted in its broadest reasonable manner, even though it is being used in conjunction with a detailed description of certain examples of embodiments of the technology. Indeed, certain terms may even be emphasized below; however, any terminology intended to be interpreted in any restricted manner will be overtly and specifically defined as such in this Detailed Description section.

The accompanying Figures depict embodiments of the present technology and are not intended to be limiting of its scope. The sizes of various depicted elements are not necessarily drawn to scale, and these various elements may be arbitrarily enlarged to improve legibility. Component details may be abstracted in the Figures to exclude details such as position of components and certain precise connections between such components when such details are unnecessary for a complete understanding of how to make and use the invention.

Many of the details, dimensions, angles and other features shown in the Figures are merely illustrative of particular embodiments of the disclosure. Accordingly, other embodiments can have other details, dimensions, angles and features without departing from the spirit or scope of the present invention. In addition, those of ordinary skill in the art will appreciate that further embodiments of the invention can be practiced without several of the details described below.

In the Figures, identical reference numbers identify identical, or at least generally similar, elements. To facilitate the discussion of any particular element, the most significant digit or digits of any reference number refers to the Figure in which that element is first introduced. For example, element 110 is first introduced and discussed with reference to FIG. 1A.

Figure 1A:
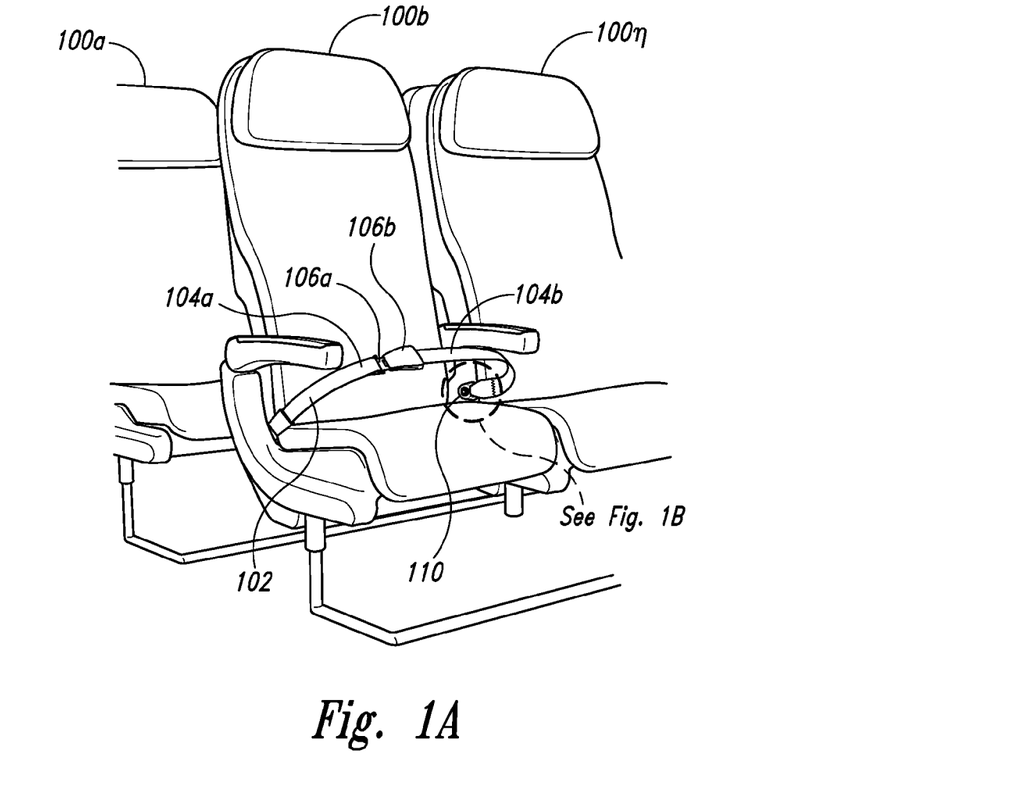
FIG. 1A is isometric view of an interior portion of a commercial aircraft passenger cabin having a seatbelt attachment apparatus configured in accordance with an embodiment of the present technology.
Figure 1B:
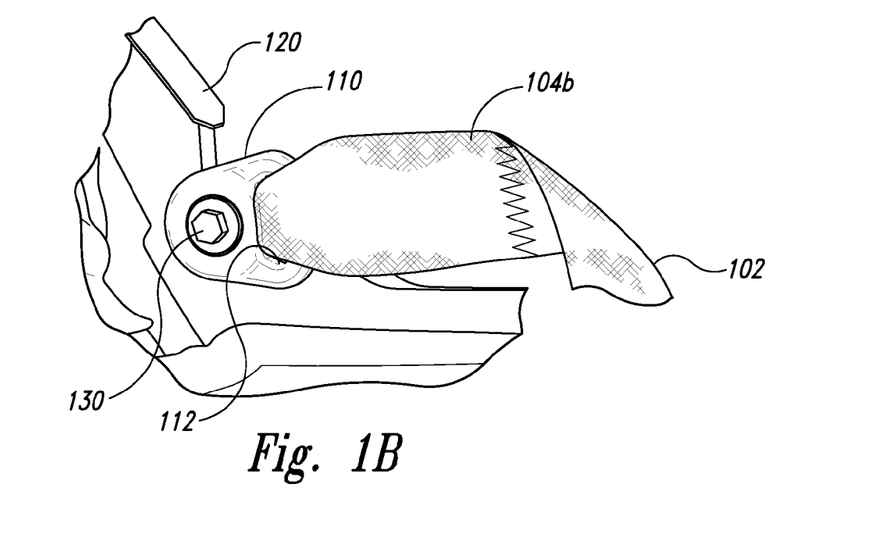
FIG. 1B is an enlarged isometric view of the seatbelt attachment apparatus of FIG. 1A.

FIG. 1A is isometric view of an interior portion of an aircraft passenger cabin having a plurality seats 100 (identified individually as seats 100a-100n) with corresponding seatbelts 102, and FIG. 1B is an enlarged isometric view taken from FIG. 1A illustrating an apparatus 110 for removably attaching the seatbelts 102 to seat frames 120 in accordance with an embodiment of the present technology. Referring first to FIG. 1A, each of the seatbelts 102 includes a first web 104a and a second web 104b. A connector tongue 106a is attached to a distal end portion of the first web 104a, and a corresponding buckle 106b is attached to a distal end portion of the second web 104b. The first and second webs 104 can be releasably joined together for use in a conventional manner by inserting the connector tongue 106a into the buckle 106b. As described in greater detail below, the proximal end portions of each of the webs 104 are securely attached to corresponding anchor points on opposite sides of the seat 100 by means of the apparatus 110. As shown in FIG. 1B, for example, the apparatus 110 is securely anchored to the seat frame 120 by a suitable fastener 130, such as a bolt or other threaded fastener, and the proximal end portion of the web 104b is securely attached to the apparatus 110 by a loop of web that extends through an aperture 112.

Figure 2A:
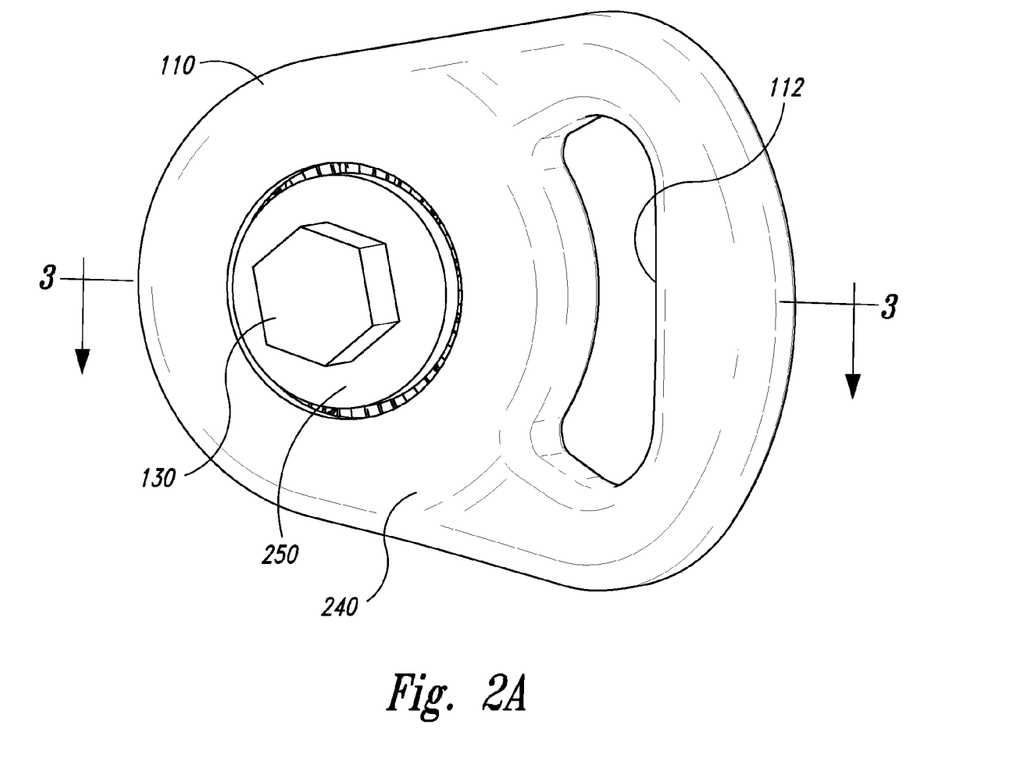
Figure 2B:
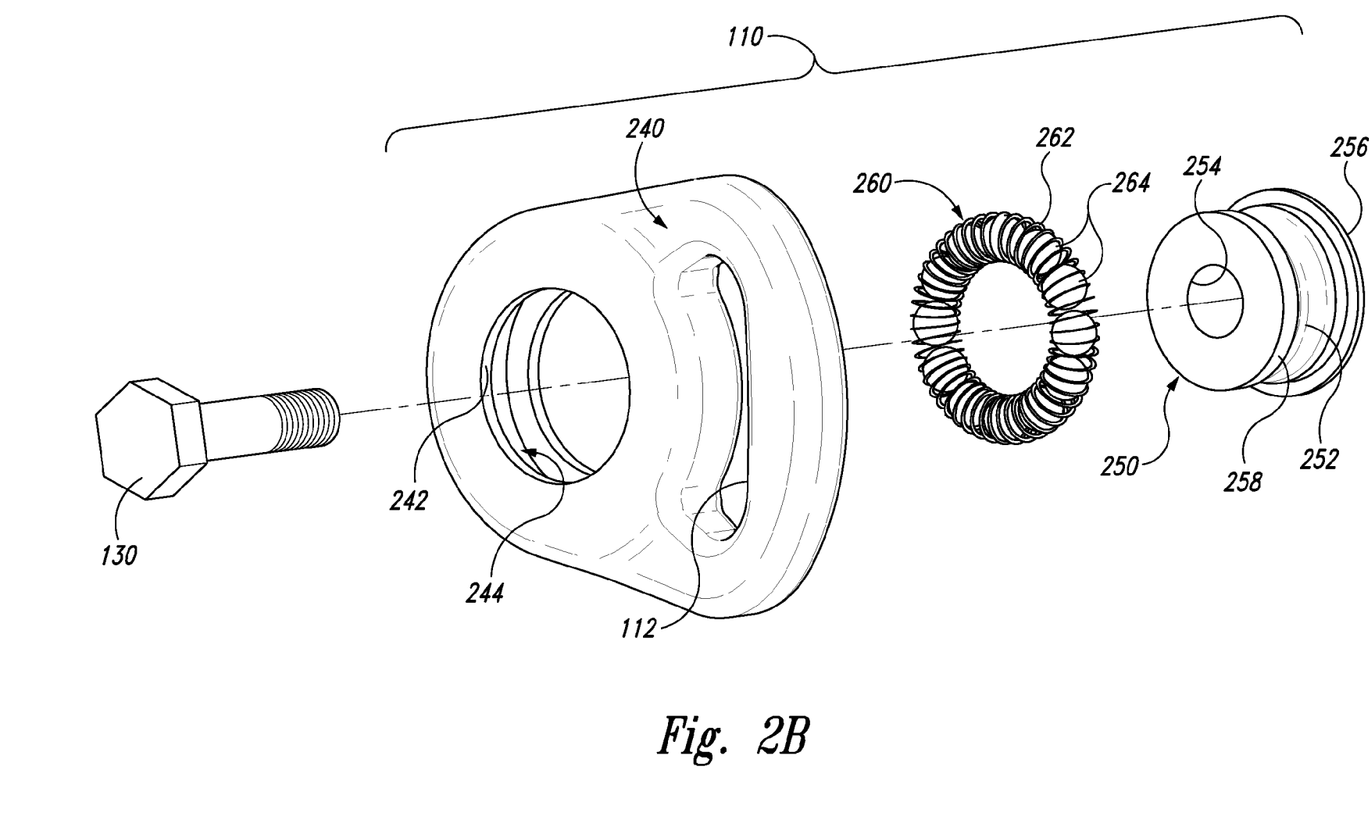
FIG. 2B is an enlarged, exploded isometric view, of the seatbelt attachment apparatus of FIGS. 1A and 1B.

FIG. 2A is an enlarged isometric view of the apparatus 110 configured in accordance with an embodiment of the present technology, and FIG. 2B is an exploded isometric view of the apparatus 110. Referring to FIGS. 2A and 2B together, in the illustrated embodiment, the apparatus 110 can be referred to as connector having a body 240, a base 250, and an annular locking device 260. In this embodiment, the web aperture 112 extends through the body 240 and is configured to receive the proximal end portion of the seatbelt web 104a, b (FIGS. 1A and 1B) for attachment thereto. In other embodiments, the seatbelt web 104a, b can be fixedly to the body 240 using other suitable structures and methods known in the art, such as fasteners, couplings, etc. In addition to the web aperture 112, the body 240 also includes a circular or cylindrical mounting aperture 242 that extends through the body 240 and forms an opening or socket configured to receive the base 250. An annular groove or cavity 244 extends circumferentially around the aperture 242 in the body 240 and is configured to receive the annular locking device 260.

In the illustrated embodiment, the base 250 is a cylindrical member that can be referred to as an "arbor" or "hub." The base 250 includes an annular groove 252 formed in an outer surface thereof between an inner flange 256 and an outer flange 258. As described in greater detail below, the groove 252 is configured to cooperate with the cavity 244 in the body 240 to retain the annular locking device 260 and securely attach the body 240 to the base 250, while enabling the body 240 to rotate about the base 250. The base 250 also includes a central through-hole 254. The fastener 130 (FIG. 1B) extends through the hole 254 and threadibly or otherwise engages the seat frame 120 to fixedly attach the base 250 to the seat frame 120. By way of example, the base 250 can have an outer diameter of from about 0.38 inch to about 1 inch or more, or about 0.625 inch. In other embodiments, connector base portions configured in accordance with the present technology can have other dimensions and features without departing from the present disclosure.

In the illustrated embodiment, the locking device 260 includes a plurality of locking elements 264 movably contained within a resilient support structure 262. In some embodiments, the individual locking elements 264 can be spherical elements (e.g., ball bearings, such as steel ball bearings), and the support structure 262 can be a resilient coil or helical spring (e.g., an interlocking garter spring having a toroid or torus shape) that forms a flexible and resilient cage or containment structure around the locking elements 264. As described in greater detail below, the resilient support structure 262 enables the annular locking device 260 to expand around the base 250 and contract into a groove 252 to operably couple the body 240 to the base 250 during use of the apparatus 110.

Figure 3:
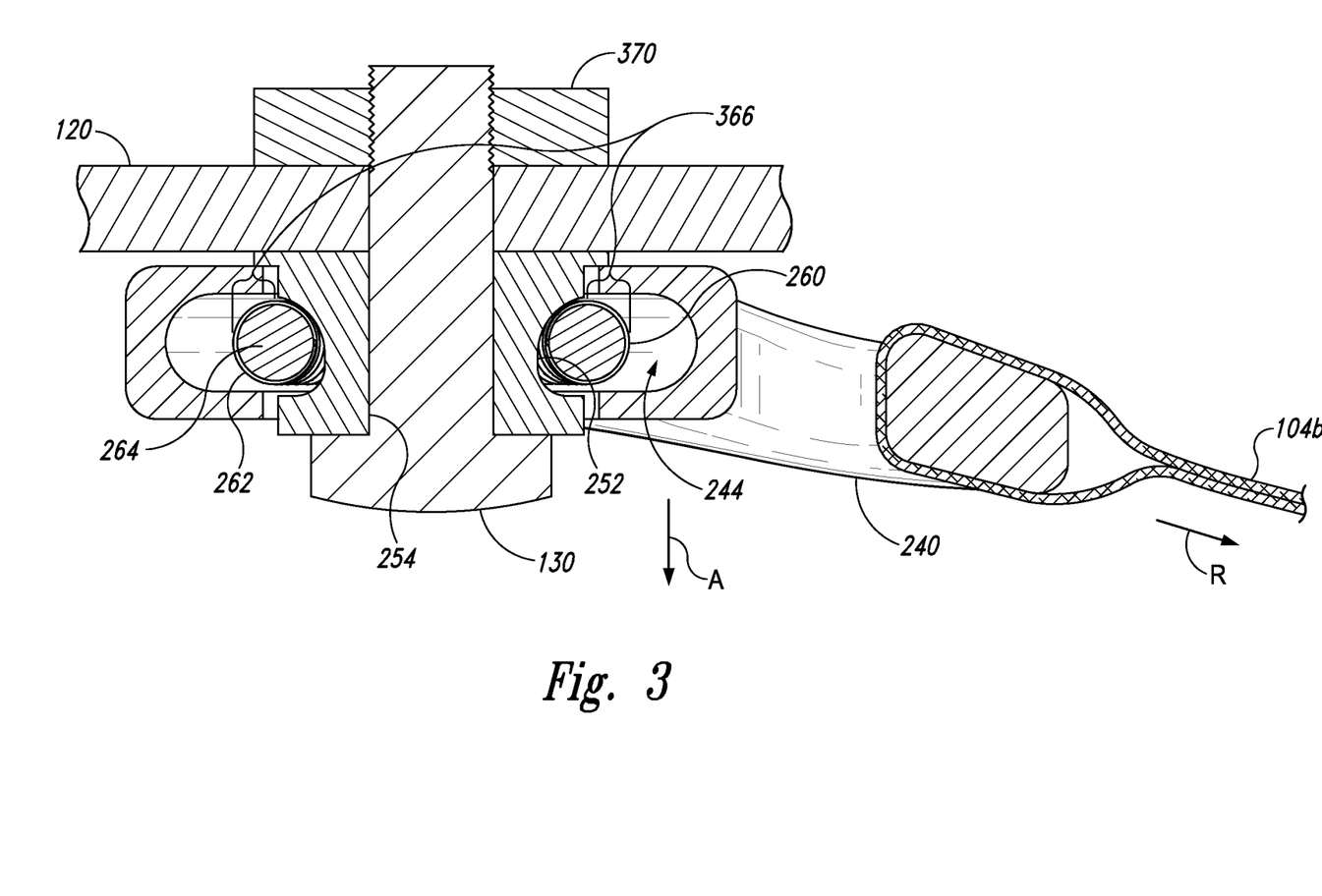
FIG. 3 is an enlarged cross-sectional view of the seatbelt attachment apparatus of FIGS. 1A-2B taken along line 3-3 in FIG. 2A.

FIG. 3 is a cross-sectional view taken along line 3-3 in FIG. 2A illustrating attachment of the body 240 to the base 250 in accordance with an embodiment of the present technology. A nut 370 or other suitable locking device engages the distal end portion of the fastener 130 to securely attach the base 250 to the seat frame 120. In this embodiment, the annular locking device 260 has resiliently contracted into the groove 252 in the base 250, and tension in the resilient support structure 262 maintains an inward compression or bias against the groove 252. However, an outer annular portion 366 of the locking device 260 protrudes radially outward from the groove 252 and extends into the adjacent cavity 244 in the body 240. This configuration prevents the body 240 from moving away from the base 250 in an axial direction indicated by arrow A, because the aperture 242 in the body 240 is too small to pass over the protruding annular portion 366 of the locking device 260. This configuration also prevents the body 240 from disengaging from the base 250 when the seatbelt web 104b is pulled in a radial direction indicated by arrow R. As noted above, however, the locking device 260 does not prevent the body 240 from rotating about the axis of the base 250. In other embodiments of the locking device 260, it is contemplated that the locking elements 264 can be omitted, and the resilient support structure 262 can be sized to provide the structural and mechanical means for coupling the body 240 to the base 250 in the manner described above. For example, if the resilient support structure 262 is a helical spring as in the illustrated embodiment, the spring can be formed of a steel or other suitable metal of sufficient gauge and strength to resist substantial deformation and lock the body 240 to the base 250.

Figure 4A:
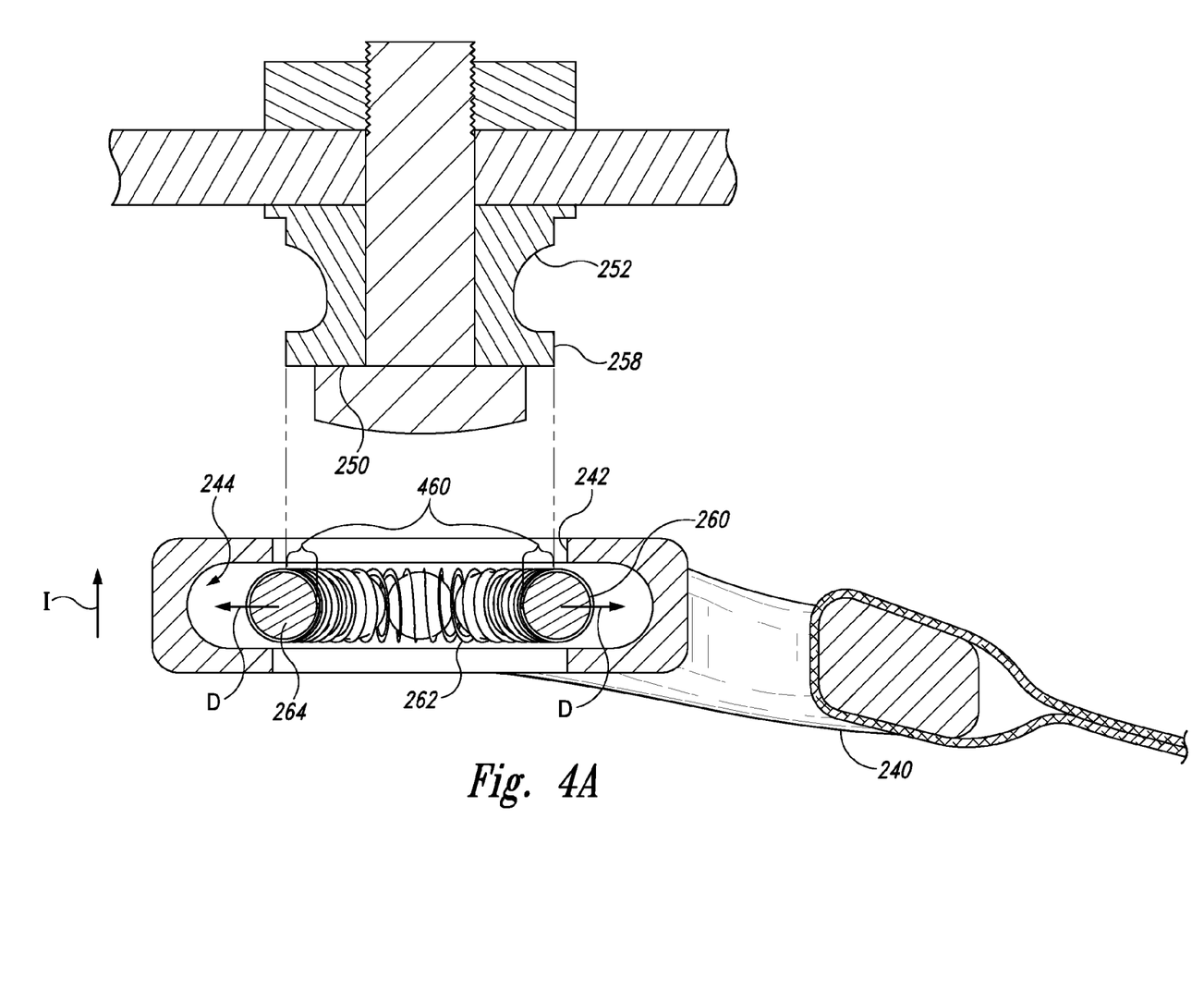
FIG. 4A is a cross-sectional view similar to FIG. 3, illustrating operation of a tool for removing a seatbelt from an anchor point in accordance with an embodiment of the present technology.
Figure 4B:
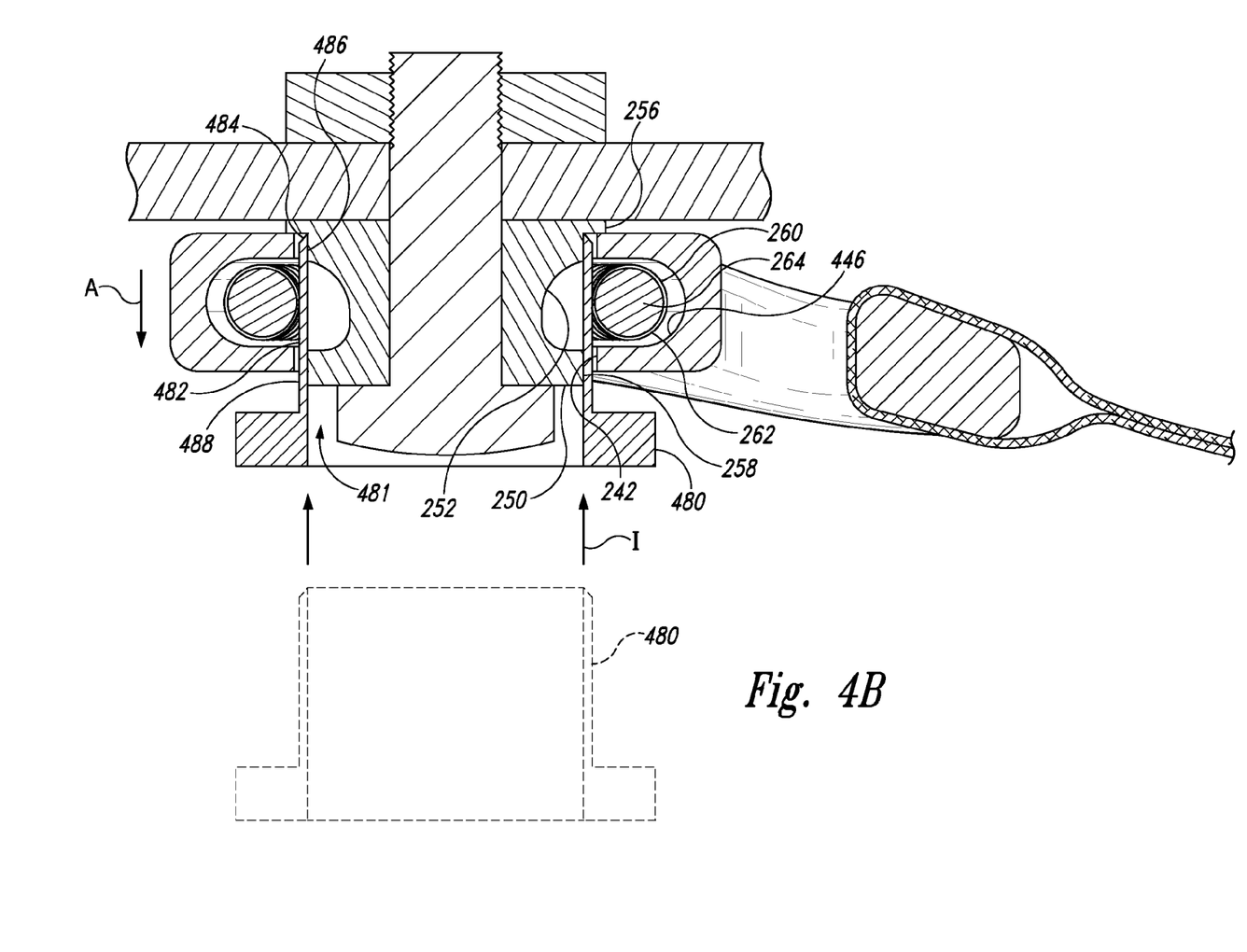
FIG. 4B is a similar cross-sectional view illustrating a method for attaching a seatbelt to an anchor point in accordance with an embodiment of the present technology.

FIG. 4A is a cross-sectional view similar to FIG. 3 for the purpose of illustrating a method of operably coupling the body 240 to the base 250, and FIG. 4B is a similar cross-sectional view illustrating the use of a tool 480 to uncouple the body 240 from the base 250, in accordance with embodiments of the present technology. Referring first to FIG. 4A, to install the body 240 onto the base 250, the aperture 242 in the body 240 is first generally aligned (e.g., coaxially aligned) with the base 250. The body 240 is then pressed toward the base 250 in the direction of arrow I. In one aspect of this embodiment, the inner diameter of the locking device 260 when the resilient support structure 262 is in the relaxed state (as shown in FIG. 4A) is smaller than the outer diameter of the flange 258 on the base 250, and in some embodiments this inner diameter may also be slightly smaller than the outer diameter of the base of the groove 252. As a result, pressing the body 240 over the base 250 causes a generally circular or annular inner portion 460 of the locking device 260 to circumferentially contact the flange 258. This contact drives the locking elements 264 radially outward in the directions of arrows D, circumferentially stretching the resilient support structure 262 and expanding the locking device 260 into the adjacent cavity 244 defined by an inner wall 446 of the body 240. As the body 240 continues moving over the base 250, the locking device 260 resiliently snaps (e.g., contracts) into the groove 252, thereby locking the body 240 to the base 250. Residual tension in the resilient support structure 262 can act to compress the locking device against the groove 252 and retain the locking device in the groove 252. Accordingly, embodiments of the attachment apparatus 110 described herein enable the body 240 (and a corresponding seatbelt) to be easily and quickly attached to the base 250 (and the corresponding seat frame) without the use of special tools.

Turning next to FIG. 4B, the tool 480 includes a central opening 481 defined by a cylindrical flange 482. In the illustrated embodiment, the cylindrical flange 482 is relatively thin and includes an outer wall 488 sized to fit within the aperture 242 in the body 240, an inner wall 486 sized to fit over at least the outer flange 258 of the base 250, and a leading edge 484 that may be tapered or outwardly chamfered. To use the tool 480 and remove the body 240 from the base 250, the leading edge 484 is inserted into the annular gap between the outer flange 258 of the base 250 and the opposing edge of the aperture 242 in the body 240. As the leading edge 484 approaches and contacts the locking device 260, it expands the locking device 260 radially outward to increase the diameter of the locking device 260 from a first diameter as shown in, e.g., FIG. 3, to a larger second diameter as shown in FIG. 4B. As the leading edge 484 continues to be inserted between the base 250 and the body 240, it eventually contacts with the inner flange 256 of the base 250. In this position, the cylindrical flange 482 contains the locking elements 264 in the body cavity 244, enabling the body 240 to be lifted off of the base 250 in the direction of the arrow A. As the body 240 moves away from the base 250, it eventually contacts the head of the tool 480 and the tool 480 and the body 240 can be removed from the base 250 as a unit. In other embodiment, it is also contemplated that the body 240 can be installed onto the base 250 by first inserting the tool 480 through the aperture 242 to expand the locking device 260 when the body 240 is as shown in FIG. 4A, and then sliding the tool 480 over the base 250 as shown in FIG. 4B. Once the body 240 is in place around the base 250, the tool 480 can be removed to allow the locking device 460 to resiliently contract into the groove 252 and lock the body 240 to the base 250.

The apparatus 110 can be manufactured from various materials using various methods known in the art. In some embodiments, the body 240 and the base 250 can be manufactured from suitable metals, such as metals that are cast, machined, forged or otherwise formed to shape. For example, the body 240 can be forged from aluminum, and the base 250 can be machined from aluminum. In other embodiments, it is contemplated that the body 240 and the base 250 can be manufactured by suitable non-metallic materials, such as suitable high strength composite materials, such as graphite/epoxy materials and the like. In some embodiments, the resilient support structure 262 can be a helical coil spring formed from a suitable steel, such as steel music wire or stainless steel of suitable gauge (e.g., 0.024 inch diameter) and heat treat. The plurality of locking elements 264 can be spherical elements formed of a suitably hard material, such as, for example, stainless steel.

Various embodiments of the attachment apparatus 110 described in detail above can have certain advantages over conventional seatbelt attachment devices, such as a conventional shackle and hook assemblies. For example, while conventional shackle and hook assemblies can weigh approximately 65-70 grams, embodiments of the attachment apparatus 110 described above can weigh approximately 20 grams, resulting in a weight savings of approximately 100 grams per seatbelt installation having two attachment apparatuses 110 (e.g., one on each side of the seat). A further advantage of some embodiments is the ease with which a seatbelt can be refurbished or replaced. For example, rather than remove a cotter pin as required by conventional shackle and hook assemblies, embodiments of the attachment apparatus 110 described herein can be removed from an anchor point by simply inserting a tool (e.g., the tool 480 described above with reference to FIG. 4A) into an aperture in the apparatus 110. Similarly, a refurbished or new seatbelt can be quickly installed by simply pressing the connector body 240 onto the connector base 250.

Although embodiments of the attachment apparatus 110 have been described above in the context of use in aircraft, those of ordinary skill in the art will readily understand that the apparatus 110 and/or various components and teachings thereof can also be used in other vehicles, such as land vehicles, water vehicles, etc. Furthermore, the described features, advantages, and characteristics of the present technology may be combined in any suitable manner in one or more embodiments. One skilled in the relevant art will recognize that the present technology can be practiced without one or more of the specific features or advantages of a particular embodiment. In other instances, additional features and advantages may be recognized in certain embodiments that may not be present in all embodiments of the present technology. The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements. Further any specific numbers noted herein are only examples: alternative implementations may employ differing values or ranges.

References throughout the foregoing description to features, advantages, or similar language do not imply that all of the features and advantages that may be realized with the present technology should be or are in any single embodiment of the invention. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may, but do not necessarily, refer to the same embodiment.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements, unless the context clearly requires otherwise. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

While the above description describes various embodiments of the invention and the best mode contemplated, regardless how detailed the above text, the invention can be practiced in many ways. Details of the system may vary considerably in its specific implementation, while still being encompassed by the present disclosure. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

From the foregoing, it will be appreciated that specific embodiments of the invention have been described herein for purposes of illustration, but that various modifications may be made without deviating from the spirit and scope of the various embodiments of the invention. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims. Moreover, although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

I claim:

1. An apparatus for attaching a seatbelt to a structure, the apparatus comprising:
 a base configured to be attached to the structure;
 a body configured to be attached to the seatbelt, the body having an aperture configured to removably receive the base; and
 an annular locking portion operably disposed between the body and the base, wherein the annular locking portion includes a plurality of spheres in a circular arrangement, the annular locking portion is movable from a first configuration having a first diameter to a second configuration having a second diameter, wherein the annular locking portion prevents disengagement of the body from the base when the annular locking portion is in the first configuration, and wherein the annular locking portion permits the body to disengage from the base when the annular locking portion is in the second configuration.

2. The apparatus of claim 1 wherein the annular locking portion is resiliently expandable from the first configuration to the second configuration, and wherein the second diameter is larger than the first diameter.

3. The apparatus of claim 1 wherein the annular locking portion includes a coil spring having a toroid shape.

4. The apparatus of claim 1 wherein the annular locking portion includes:
 a support member resiliently supporting the plurality of spheres in a circular arrangement.

5. An apparatus for attaching a seatbelt to a structure, the apparatus comprising:
 a base configured to be attached to the structure;
 a body configured to be attached to the seatbelt, the body having an aperture configured to removably receive the base; and
 an annular locking portion operably disposed between the body and the base,
  wherein the annular locking portion includes
  a helical spring; and
  a plurality of balls contained within the helical spring, wherein the annular locking portion is movable from a first configuration having a first diameter to a second configuration having a second diameter, wherein the annular locking portion prevents disengagement of the body from the base when the annular locking portion is in the first configuration, and wherein the annular locking portion permits the body to disengage from the base when the annular locking portion is in the second configuration.

6. The apparatus of claim 1 wherein the base includes an annular groove, and wherein the annular locking portion is operably disposed in the annular groove when the annular locking portion is in the first configuration and the body is engaged with the base.

7. The apparatus of claim 1 wherein the body includes a cavity, and wherein the annular locking portion is carried in the cavity when the annular locking portion is expanded to the second configuration.

8. The apparatus of claim 1 wherein the base includes an annular groove and the body includes an annular cavity sized to surround the annular groove, and wherein the annular locking portion is partially disposed in the annular groove and partially disposed in the annular cavity when the annular locking portion is in the first configuration and the body is engaged with the base.

9. An apparatus for attaching a seatbelt to a structure, the apparatus comprising:
 a base configured to be attached to the structure, wherein the base has a cylindrical shape and a central through-hole configured to receive a fastener that attaches the base to the structure;
 a body configured to be attached to the seatbelt, the body having an aperture configured to removably receive the base; and
 an annular locking portion operably disposed between the body and the base, wherein the annular locking portion is movable from a first configuration having a first diameter to a second configuration having a second diameter, wherein the annular locking portion prevents disengagement of the body from the base when the annular locking portion is in the first configuration, wherein the annular locking portion permits the body to disengage from the base when the annular locking portion is in the second configuration, and wherein the body is rotatable about the fastener when the annular locking portion is in the first configuration.

10. An apparatus for attaching a seatbelt to a structure, the apparatus comprising:
 a base configured to be attached to the structure;
 a body having a mounting aperture configured to removably receive the base, the body further having a web aperture configured to receive a web of the seatbelt to attach the seatbelt to the body; and
 an annular locking portion operably disposed between the body and the base, wherein the annular locking portion is movable from a first configuration having a first diameter to a second configuration having a second diameter, wherein the annular locking portion prevents disengagement of the body from the base when the annular locking portion is in the first configuration, and wherein the annular locking portion permits the body to disengage from the base when the annular locking portion is in the second configuration.

11. The apparatus of claim 1 wherein the plurality of spheres include a plurality of metal balls.

12. The apparatus of claim 1 wherein the body is rotatable about the base when the annular locking portion is operably disposed between the body and the base.

13. The apparatus of claim 1 wherein the body includes a web aperture configured to receive a web of the seatbelt to attach the seatbelt to the body.

14. The apparatus of claim 5 wherein the base includes an annular groove, and wherein the annular locking portion is operably disposed in the annular groove when the annular locking portion is in the first configuration and the body is engaged with the base.

15. The apparatus of claim 5 wherein the body includes a cavity, and wherein the annular locking portion is disposed in the cavity when the annular locking portion is expanded to the second configuration.

16. The apparatus of claim 5 wherein the body is rotatable about the base when the annular locking portion is operably disposed between the body and the base.

17. The apparatus of claim 5 wherein the body includes a web aperture configured to receive a web of the seatbelt to attach the seatbelt to the body.

18. The apparatus of claim 9 wherein the annular locking portion is resiliently expandable from the first configuration to the second configuration, and wherein the second diameter is larger than the first diameter.

19. The apparatus of claim 9 wherein the annular locking portion includes a plurality of spherical elements in a circular arrangement.

20. The apparatus of claim 9 wherein the annular locking portion includes a coil spring having a toroid shape.

21. The apparatus of claim 9 wherein the base includes an annular groove and the body includes an annular cavity sized to surround the annular groove, and wherein the annular locking portion is partially disposed in the annular groove and partially disposed in the annular cavity when the annular locking portion is in the first configuration and the body is engaged with the base.

22. The apparatus of claim 9 wherein the body includes a web aperture configured to receive a web of the seatbelt to attach the seatbelt to the body.

23. The apparatus of claim 10 wherein the annular locking portion includes a plurality of spherical elements in a circular arrangement.

24. The apparatus of claim 10 wherein the annular locking portion includes a support member resiliently supporting a plurality of spherical elements in a circular arrangement.

25. The apparatus of claim 10 wherein the base includes an annular groove, and wherein the annular locking portion is operably disposed in the annular groove when the annular locking portion is in the first configuration and the body is engaged with the base.

26. The apparatus of claim 10 wherein the body includes a cavity, and wherein the annular locking portion is carried in the cavity when the annular locking portion is expanded to the second configuration.

* * * * *